R. F. STEIN.
APPARATUS FOR FACILITATING THE DISMANTLING OF SECONDARY BATTERIES.
APPLICATION FILED AUG. 27, 1919.
1,358,345.  Patented Nov. 9, 1920.
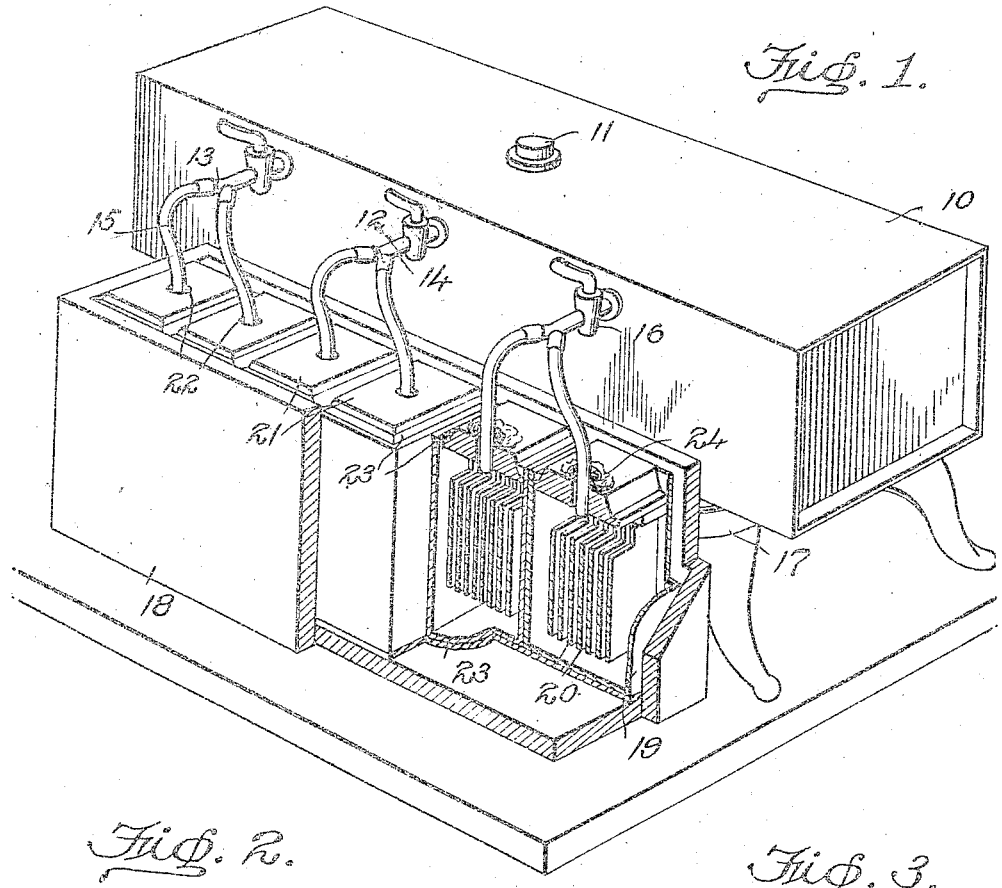
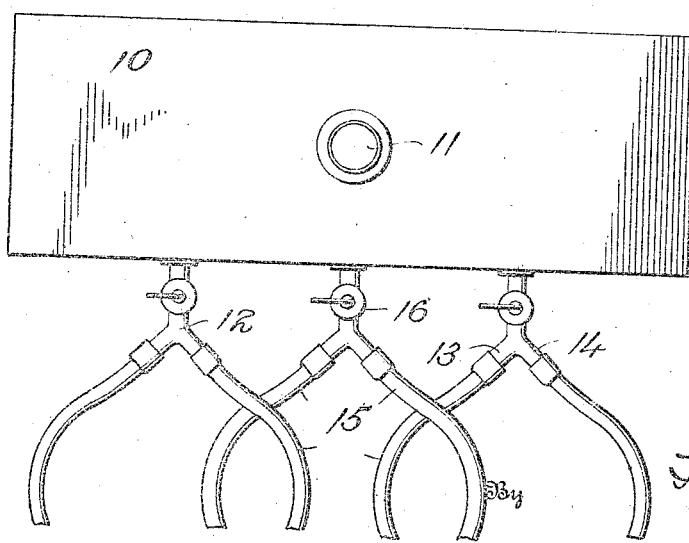
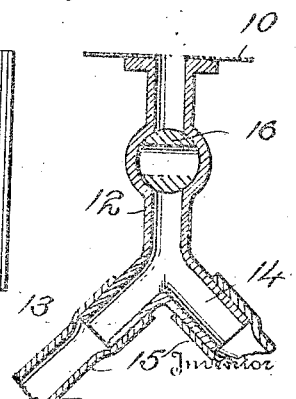
R. F. Stein,
Henry T. Wright
Attorney

UNITED STATES PATENT OFFICE.

RUDOLPH F. STEIN, OF MINNEAPOLIS, MINNESOTA, ASSIGNOR TO UNITED STATES ORDNANCE COMPANY, OF WASHINGTON, DISTRICT OF COLUMBIA, A CORPORATION OF VIRGINIA.

APPARATUS FOR FACILITATING THE DISMANTLING OF SECONDARY BATTERIES.

1,358,345.  Specification of Letters Patent.  Patented Nov. 9, 1920.

Original application filed June 19, 1919, Serial No. 305,375. Divided and this application filed August 27, 1919. Serial No. 320,153.

*To all whom it may concern:*

Be it known that I, RUDOLPH F. STEIN, a citizen of the United States, residing at Minneapolis, in the county of Hennepin, State of Minnesota, have invented certain new and useful Improvements in Apparatus for Facilitating the Dismantling of Secondary Batteries, of which the following is a specification.

My invention relates to apparatus for facilitating the dismantling of secondary batteries in accordance with my improved method described and claimed in my copending application filed June 19, 1919, Serial No. 305,375, and of which this application is a division.

The apparatus constituting the subject matter of this application will be more clearly understood from the following detail description wherein—

Figure 1 is a perspective view illustrative of my improved method and showing the apparatus for carrying the method into practice operatively associated with a plural cell secondary battery, the latter being shown in section;

Fig. 2, a plan view of one form of apparatus suitable for carrying my method into practice; and Fig. 3, a section through one of the steam conveying nozzles of the apparatus.

Referring now particularly to the drawings I have shown an apparatus capable of use in dismantling 12 volt secondary batteries or secondary batteries of less than 12 volts. Such apparatus comprises a boiler 10 having a filling opening closed by a cap 11. Leading from the interior of the boiler 10 near the top of the latter are three steam conveying nozzles 12 each of which has its outer end forked to form furcations 13 and 14 and on which latter are engaged respectively flexible pipes 15 preferably constructed of pure gum rubber and of suitable length for the purposes intended. Each of the nozzles 12 is provided with a valve 16 for controlling the flow of steam from the boiler which latter is supported above any suitable heating apparatus after being filled with the desired quantity of water. In this instance I show the boiler supported upon an ordinary gas stove 17.

In the secondary battery illustrated 18 is the casing of the battery, 19 the jars, 20 the positive and negative plates and separators contained in each jar, 21 the jar tops, 22 the vent openings of the tops and 23 the sealing compound which secures the jars and tops in place all as is well known.

Assuming that it is desired to remove the tops 21 of the jars 19 the closures of the vent openings 22 are first removed and the pipes 15 introduced through said vent openings. The necessary quantity of steam is then raised in the boiler 10 and the valve 16 opened to deliver the steam within the battery through the pipes 15. The delivered steam is confined within the battery by means of burlap 24 or other suitable packing placed over the top of the battery and around the ends of the pipes 15 where the latter enter the vent holes. The introduction of steam into the battery is continued for about ten minutes or until such time as the sealing compound 23 is heated sufficiently to render the same plastic. When this status of the sealing compound is had the burlap 24 is removed and the compound subsequently removed with the aid of a putty knife or other suitable instrument. When the removal of the plastic compound is completed the jar tops 21 can be easily lifted away. By resorting to the method just described no odor is created and the removal of the jar tops is effected in about one-half the time required when the use of hot chisels is depended upon to remove the sealing compound.

If it is then desired to remove the jars 19 it is only necessary to first remove the plates and separators from within the jars and then repeat the operation just described until the sealing compound holding the jars is reduced to a plastic state when it is possible to withdraw the jars with a pair of pincers or pliers or even with the hand.

I claim:

1. An apparatus for facilitating the dismantling of secondary batteries comprising a boiler, a steam conveying nozzle leading from the boiler and having a plurality of branches, flexible pipes for insertion in the vents of secondary batteries leading from the branches of the nozzle, and a valve in said nozzle for controlling the flow of steam therethrough.

2. An apparatus for facilitating the dismantling of secondary batteries comprising a boiler, a plurality of steam conveying nozzles leading from the boiler, flexible pipes for insertion in the vents of secondary batteries leading from the nozzle respectively, and a valve in each nozzle for controlling the flow of steam therethrough.

3. In combination in apparatus for disassembling storage batteries, a steam generator composed of a chamber structure and a heating device and a plurality of conductors connected to the said structure, the said structure being of horizontally elongated form, having means for being supplied with water and the connecting devices for the said conductors being in the form of valve or cock controlled devices that are mounted on the wall of the said chamber structure and are positioned in a plane above such water level.

In testimony whereof I affix my signature in the presence of two witnesses.

RUDOLPH F. STEIN.

Witnesses:
  ALBERT P. REED,
  LOUIS A. REED.